United States Patent
Olivarez et al.

(10) Patent No.: US 9,304,880 B2
(45) Date of Patent: Apr. 5, 2016

(54) SYSTEM AND METHOD FOR MULTICORE PROCESSING

(71) Applicants: Michael L. Olivarez, Pflugerville, TX (US); Stephen J. Benzel, Austin, TX (US); Robert N. Ehrlich, Round Rock, TX (US); Robert A. McGowan, Cedar Park, TX (US)

(72) Inventors: Michael L. Olivarez, Pflugerville, TX (US); Stephen J. Benzel, Austin, TX (US); Robert N. Ehrlich, Round Rock, TX (US); Robert A. McGowan, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 161 days.

(21) Appl. No.: 13/843,090

(22) Filed: Mar. 15, 2013

(65) Prior Publication Data
US 2014/0281735 A1     Sep. 18, 2014

(51) Int. Cl.
*G06F 11/00* (2006.01)
*G06F 11/22* (2006.01)

(52) U.S. Cl.
CPC .................................. *G06F 11/2242* (2013.01)

(58) Field of Classification Search
USPC ................................................. 714/32, 25, 11
See application file for complete search history.

(56) References Cited

U.S. PATENT DOCUMENTS

| | | | |
|---|---|---|---|
| 7,200,839 B2 | 4/2007 | Kadlecik et al. | |
| 2004/0117743 A1 | 6/2004 | Gehman et al. | |
| 2005/0034017 A1* | 2/2005 | Airaud et al. | 714/25 |
| 2005/0273671 A1* | 12/2005 | Adkisson et al. | 714/43 |
| 2008/0307260 A1* | 12/2008 | Kang et al. | 714/27 |
| 2010/0281304 A1* | 11/2010 | Moyer et al. | 714/37 |
| 2011/0072309 A1 | 3/2011 | Sakai et al. | |

* cited by examiner

*Primary Examiner* — Sarai Butler

(57) ABSTRACT

A method and apparatus for an asynchronous multicore common debugging system is described. Debug signals from a plurality of processor cores are synchronized to a common timing domain. Processing completed within the plurality of processor cores during a common timing interval is tracked. A single debugging tool chain is utilized to provide debugging results in response to the tracking the processing completed within the plurality of processor cores during the common timing interval.

20 Claims, 6 Drawing Sheets

SYSTEM AND METHOD FOR MULTICORE PROCESSING

BACKGROUND

1. Field of the Disclosure

This disclosure relates generally to information processing systems and, more specifically, to debugging technology for processing systems.

2. Description of the Related Art

When debugging heterogeneous multicore processors, there are different tool sets used with no interaction between the different tool sets. Heterogeneous multicore processors include processing systems in which the processor cores are not all identical. As an example, a heterogeneous multicore processor may include different types of processor cores. For example, one or more processor cores may be oriented toward general purpose processing, while one or more processor cores may be optimized for a specific application, for example, digital signal processing.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
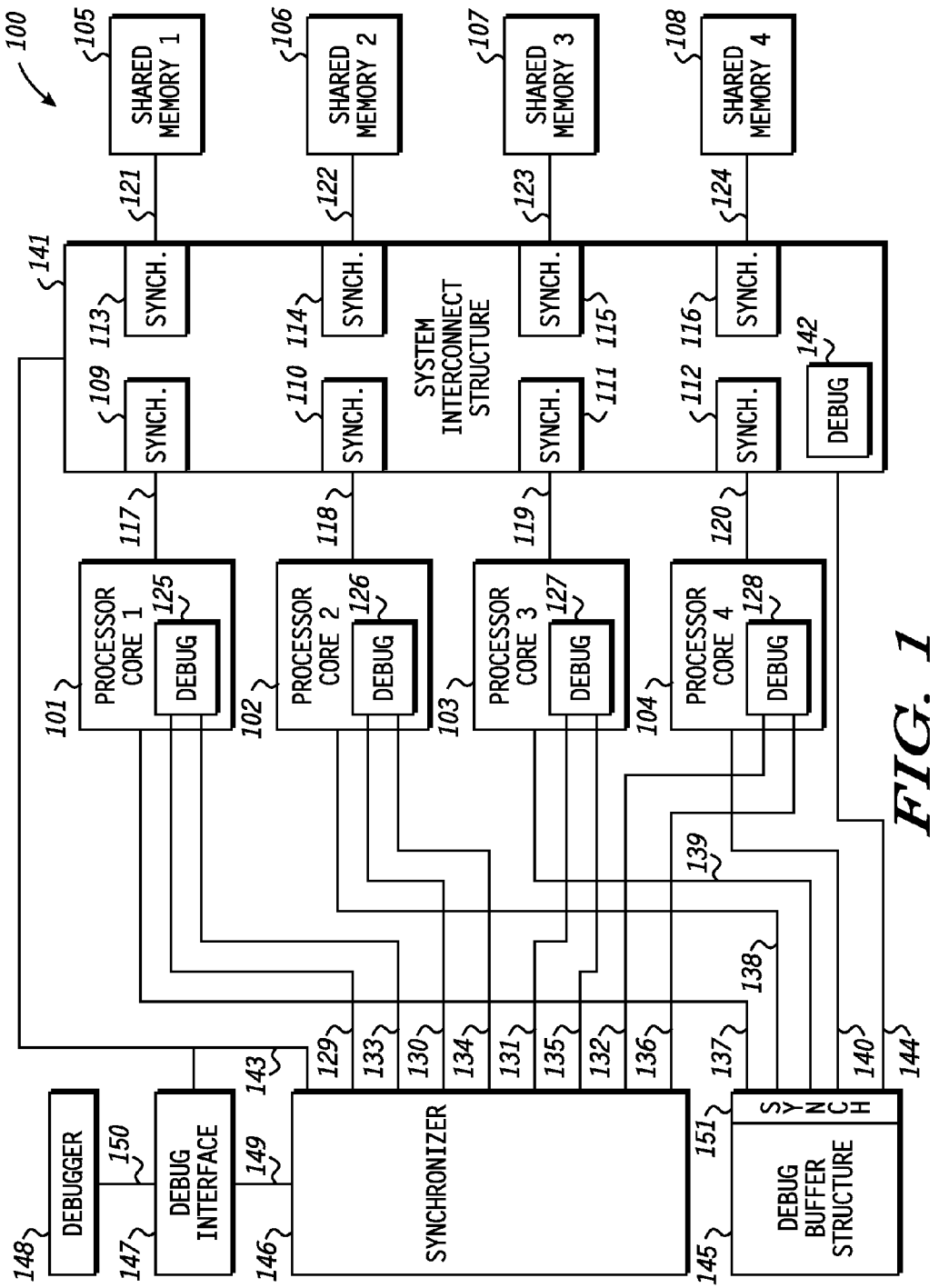
FIG. 1 is a block diagram illustrating a system incorporating debugging apparatus in accordance with at least one embodiment.

A method and apparatus for an asynchronous multicore common debugging system is described. Debug signals from a plurality of processor cores, which can include heterogeneous cores, are synchronized to a common timing domain. Processing completed within the plurality of processor cores during a common timing interval is tracked. A single debugging tool chain is utilized to provide debugging results in response to tracking the processing completed within the plurality of processor cores during the common timing interval. A debugging tool chain comprises elements to obtain debugging signals from a processor core and to provide debugging messages to a debug interface. In accordance with at least one embodiment, a debugging tool chain may also comprise an external debugger connected to the debug interface. In accordance with at least one embodiment, tracking the processing completed within the plurality of processor cores during the common timing interval comprises tracking interprocessor communications (IPC) and program code instructions completed within the plurality of processor cores during the common timing interval, and the order of processing completed by the plurality of processor cores includes the order of interprocessor communications (IPC) completed and of program code instructions completed. Such tracking can be performed, for example, by monitoring, with reference to a common timing domain, IPC and program code instructions completed within the plurality of processor cores during the common timing interval. As an example, a debug module can timestamp instances of IPC and program code instructions according to a common timing domain, which may, for example, be a timing domain of a processor core designated as a master processor core. By analyzing such IPC and program code instructions according to their order of processing according to their timestamps referenced to a common timing domain, a temporally coherent representation of the operation of the multiple processor cores may be obtained.

Use of a common tool for monitoring interprocessor communication (IPC) among processor cores which may be heterogeneous (wherein at least one processor is of a different type than at least one other processor) is enabled. Even if the heterogeneous processor cores are also asynchronous with one another (where there is no guarantee of a constant relationship of phase and timing of at least one clock source of at least one processor core with at least one clock source of at least one other processor core), common timestamp information is provided to allow determining interaction of the processes among the different cores. Since using multiple tools and debug probes for each separate core can be expensive and may be cost prohibitive for consumer/embedded devices, elimination of a need for multiple tools and debug probes can reduce expense and streamline operations. Furthermore, using multiple tools can complicate the effort involved, so avoiding the need for multiple tools can reduce and simplify effort.

In one embodiment, the debugging system allows simultaneous debugging of heterogeneous or homogenous, asynchronous or synchronous, multiple processor cores using a single debugging interface and a single debugger. For example, the debugging system may be used for debugging a system-on-chip (SoC) comprising a programmable microcontroller unit (MCU) and a programmable specialized execution unit (SEU), wherein the MCU and the SEU may both have processor cores for executing program code, but the MCU and SEU may be structurally and functionally different from one another (e.g., heterogeneous). For example, the MCU may be a general purpose processor while the SEU may be dedicated to a specialized processing function, such as digital signal processing (DSP). In accordance with at least one embodiment, an ability to debug not only program code of multiple, potentially heterogeneous, potentially asynchronous, processor cores, but also interprocessor communication (IPC) between those processor cores, is provided. By allowing a single debugging tool chain to be used for debugging heterogeneous multicore processing structures, the overall cost of providing effective debugging capability can be lowered. As used herein, heterogeneous describes processor cores that exhibit specific differences from one another. As examples, heterogeneous processor cores may utilize different instruction sets, may utilize different debugging protocols, may have different processor capabilities, or may have different processor architectures.

A single debugging tool chain is provided that keeps track of the processing completed within a common timing interval referenced to a common timing interval point (typically derived from a main interconnect structure), wherein the processing performed by the multiple processing cores is synchronized such that interprocessor communications (IPC) can be effectively debugged as well as the programmable processing elements' program code. The common timing interval point provides a reference such that trace data can recreate the processing completed with timing and synchronization for IPC. The debugger treats the processing as separate pipeline stages when debugging IPC or separate processors and debugs the data based on what is completed within the common timing interval. By treating the processing as separate pipeline stages, the debugger tracks the instruction code flows being processed by the different processor cores as separate instruction code flows, but, by also tracking IPC between the processing cores, the debugger is able to track relationships, for example, dependencies, between those separate instruction code flows. As the processors may be asynchronous, the processing completed may include processing completed within one processor cycle of a completed system interconnect cycle that ends the common timing interval. By providing a single debugging control interface common to all processor cores, connection of the debugger to the target processing structure is simplified. The use of a single debugging tool chain to provide debugging results in response to the tracking of processing completed within processor cores during a common timing interval may be performed within a temporally contiguous single debugging session.

In accordance with at least one embodiment, debugging signals from other processor cores are synchronized to a processor core timing domain (e.g., a processor core interconnect) of one (e.g., a master) processor core, and the step debugging of the other processor cores is performed such that the processor core cycles of the other processor cores are run to a point in time proximate to a point in time at which the number of processor core cycles being run by the one (e.g., master) processor core are completed. In accordance with at least one embodiment, the processing completed within the plurality of processor cores during the common timing interval includes processing completed within one processor cycle of a completed interconnect cycle of the one (e.g., master) processor core. As an example, processing of another processor core may be stopped within one processor cycle of the one processor before the processing of the one processor core is stopped. As another example, processing of the another processor core may be stopped within one processor cycle of the one processor after the processing of the one processor core is stopped. As yet another example, processing of the another processor core may be stopped within one processor cycle of the one processor either before or after the processing of the one processor core is stopped, depending on whether stopping the another processor core before or after results in the closest temporal alignment of the points at which the processing of the one processor core and the processing of the another processor core are stopped. A common stop trigger and a common start trigger are utilized on all processor cores to keep them synchronized. The common stop trigger and the common start trigger are based on a processor core interconnect speed of the one (e.g., master) processor core to reduce the chance of data corruption and to keep the cores closer to being in synchronization with each other. Time stamping can be obtained from the one (e.g., master) processor core and be used as common time stamping on all processor cores, wherein the processing completed within the plurality of processor cores during the common timing interval is time stamped according to increments of the common timing interval. Debugging of threads that are pipelined across heterogeneous and asynchronous architectures with relative accuracy is provided. A flow trace methodology can easily be used to reconstruct the program flow using instruction accurate simulation of a processor core for faster debugging and accurate reconstruction of the instruction pipeline. Interprocessor communication (IPC), such as locks, mutexes (mutual exclusions), and semaphores, may be analyzed to allow the asynchronous multicore pipeline to be accurately represented and to create synchronizations points across the processor cores. A lock is a synchronization mechanism for enforcing limits on access to a resource in a multi-threaded processing environment, for example, among processor cores of a multicore processor. As semaphore is a simple lock that may be implemented as a binary state indicator that need not distinguish between shared (e.g., read only) and exclusive (e.g., read and write) modes. A mutex is a mutually exclusive lock capable of enforcing exclusive access by a single thread (e.g., a thread executed on a single processor core of a multicore processor), which may enable, for example, reading and writing of information to a resource, such as memory, without conflict. Providing a synchronization technique for trace data enables asynchronous simultaneous multicore debugging via a single common debugging interface. The provision of a common debugging interface and the treatment of asynchronous processing elements within a system as a single unit for system debugging allows for easier IPC debugging within a single tool chain.

FIG. 1 is a block diagram illustrating a system 100 incorporating debugging apparatus in accordance with at least one embodiment. The system 100 comprises a processor core 101, a processor core 102, a processor core 103, a processor core 104, a shared memory 105, a shared memory 106, a shared memory 107, a shared memory 108, interconnect structure 141 (which, in one embodiment, is a bus), a debug buffer structure 145, a synchronizer 151, a synchronizer 146, a debug interface 147, and a debugger 148. Processor core 101 comprises a debug block 125. Processor core 102 comprises a debug block 126. Processor core 103 comprises a debug block 127. Processor core 104 comprises a debug block 128. System interconnect structure 141 comprises a synchronizer 109, a synchronizer 110, a synchronizer 111, a synchronizer 112, a synchronizer 113, a synchronizer 114, a synchronizer 115, a synchronizer 116, and a debug block 142.

Processor core 101 is connected to synchronizer 109 via connection 117. Processor core 102 is connected to synchronizer 110 via connection 118. Processor core 103 is connected to synchronizer 111 via connection 119. Processor core 10 is connected to synchronizer 112 via connection 120. Shared memory 105 is connected to synchronizer 113 via connection 121. Shared memory 106 is connected to synchronizer 114 via connection 122. Shared memory 107 is connected to synchronizer 115 via connection 123. Shared memory 108 is connected to synchronizer 116 via connection 124.

Processor core 101 is connected to synchronizer 151 via connection 137. Processor core 102 is connected to synchronizer 151 via connection 138. Processor core 103 is connected to synchronizer 151 via connection 139. Processor core 104 is connected to synchronizer 151 via connection 140. System interconnect structure 141 is connected to synchronizer 151 via connection 144. Processor core 101 is connected to and can provide debug signals to synchronizer 146 via connection 133. Synchronizer 146 is connected to and can provide debug control signals to processor core 101 via connection 129. Processor core 102 is connected to and can provide debug signals to synchronizer 146 via connection 134. Synchronizer 146 is connected to and can provide debug control signals to processor core 102 via connection 130. Processor core 103 is connected to and can provide debug signals to synchronizer 146 via connection 135. Synchronizer 146 is connected to and can provide debug control signals to processor core 103 via connection 131. Processor core 104 is connected to and can provide debug signals to synchronizer 146 via connection 136. Synchronizer 146 is connected to and can provide debug control signals to processor core 104 via connection 132. System interconnect structure 141 is connected to and can provide common timing domain signals to synchronizer 146 and to debug interface 147 via connection 143. Synchronizer 146 is connected to debug interface 147 via connection 149. Debug interface 147 is connected to debugger 148 via connection 150.

Processor cores 101, 102, 103, and 104 need not be identical in structure and need not operate synchronously. Shared memories 105, 106, 107, and 108 need not be identical in structure and need not operate synchronously. While four processor cores 101, 102, 103, and 104 and four shared memories 105, 106, 107, and 108 are illustrated, the number of processor cores need not be equal to the number of shared memories—any number of processor cores and any number of shared memories may be implemented.

Synchronizers 109, 110, 111, and 112 synchronize the signals communicated between processors cores 101, 102, 103, and 104, respectively, and system interconnect structure 141, allowing communication between processor cores 101, 102, 103, and 104 and system interconnect structure 141 regardless of any differences in timing domains between such elements. Synchronizers 109, 110, 111, and 112 synchronize system interconnect signals from processor cores 101, 102, 103, and 104, respectively, with a system interconnect timing domain of system interconnect structure 141. Synchronizers 109, 110, 111, and 112 synchronize system interconnect signals from system interconnect structure 141 with processor core timing domains of processor cores 101, 102, 103, and 104, respectively.

Synchronizers 113, 114, 115, and 116 synchronize the signals communicated between shared memories 105, 106, 107, and 108, respectively, and system interconnect structure 141, allowing communication between shared memories 105, 106, 107, and 108 and system interconnect structure 141 regardless of any differences in timing domains between such elements. Synchronizers 113, 114, 115, and 116 synchronize system interconnect signals from shared memories 105, 106, 107, and 108, respectively, with a system interconnect timing domain of system interconnect structure 141. Synchronizers 105, 106, 107, and 108 synchronize system interconnect signals from system interconnect structure 141 with shared memory timing domains of shared memories 105, 106, 107, and 108, respectively.

Synchronizer 151 synchronizes trace data from processor cores 101, 102, 103, and 104 with a debug buffer structure timing domain of debug buffer structure 145. Synchronizer 151 synchronizes signals from debug buffer structure 145 with processor core timing domains of processor cores 101, 102, 103, and 104.

Synchronizer 146 synchronizes debug signals from processor cores 101, 102, 103, and 104 with a debug timing domain of debugger 148. In accordance with at least one embodiment, the debug timing domain of debugger 148 is derived from a system interconnect timing domain of interconnect structure 141. In such a case, debug signals are synchronized to a system interconnect timing domain, for example, the interconnect structure 141 can be a clocked structure, such as a cross-point switch, wherein the system interconnect timing, e.g., the timing of interconnect structure 141, serves as a common timing domain to which the debug signals from the processor cores are synchronized, and an interconnect cycle of the interconnect timing domain serves as a common timing interval. Alternatively, the debug timing domain of debugger 148 can be derived from a processor core timing domain, such as that of processor core 101, and synchronizer 146 synchronizes signals from interconnect structure 141 with the debug timing domain of debugger 148. In such a case, the processor core timing domain of processor core 101 serves as a common timing domain to which the debug signals from the other processor cores are synchronized. The common timing domain to which the debug signals are synchronized may be selectable, wherein the common timing domain may be selected, for example, in response to reception of a user input, from among a variety of possible common timing domains, for example, a system interconnect timing domain of interconnect structure 141, a processor core timing domain of processor core 101, a processor core timing domain of another processor core, and the like.

System interconnect timing and processor core timing need not be of similar frequency, but may greatly differ in frequency. For example, system interconnect timing may be of much lower frequency than processor core timing. Thus, a single interconnect cycle in the system interconnect timing domain may span a duration similar to many (e.g., even hundreds of) clock cycles in a processor core timing domain. Therefore, many instructions may be executed by a processor core during a single interconnect cycle in the system interconnect timing domain. If single-stepping is referenced to the system interconnect timing domain, even a single step in such a timing domain may allow many instructions to be processed by a processor core. If processor cores are operating at different clock frequencies, are asynchronous, or are heterogeneous, the numbers of clock cycles of the different processor cores and the numbers of instructions executed by the different processor cores during a single interconnect cycle in the system interconnect timing domain may be different among the different processor cores. A processor core may, for example, have its own local memory (e.g., random-access memory (RAM)), for example, a cache or a local tightly coupled RAM. Such local memory may be connected to its processor core via a local interconnect (which may, in one embodiment, be a local bus), wherein the local interconnect may operate at a core clock frequency of the processor core rather than a system interconnect frequency of a system interconnect.

Synchronizer 146 synchronizes debug control signals from debugger 148, via debug interface 147, with processor core timing domains of processor cores 101, 102, 103, and 104. Alternatively, synchronizer 146 synchronizes debug control signals from debugger 148, via debug interface 147, with processor core timing domains of processor cores 102, 103, and 104 and with a system interconnect timing domain of interconnect structure 141. Synchronizer 146, as one example, may use a cascaded flip-flop structure, such as two cascaded flip-flops having clock inputs from a clock domain of their intended destination, or, as another example, any asynchronous first-in-first-out (FIFO) buffer capable of receiving input data of an input clock domain and providing output data of an output clock domain, or, as yet another example, a multiplexer synchronizer where a multiplexer selection input and at least one multiplexer data input are from a clock domain of the multiplexer synchronizer's intended destination. Synchronizer 146 may use different types of synchronizing elements for different types of signals, for example, may use cascaded flip-flops for control signals and, for example, a multiplexer synchronizer for data signals.

Figure 2:
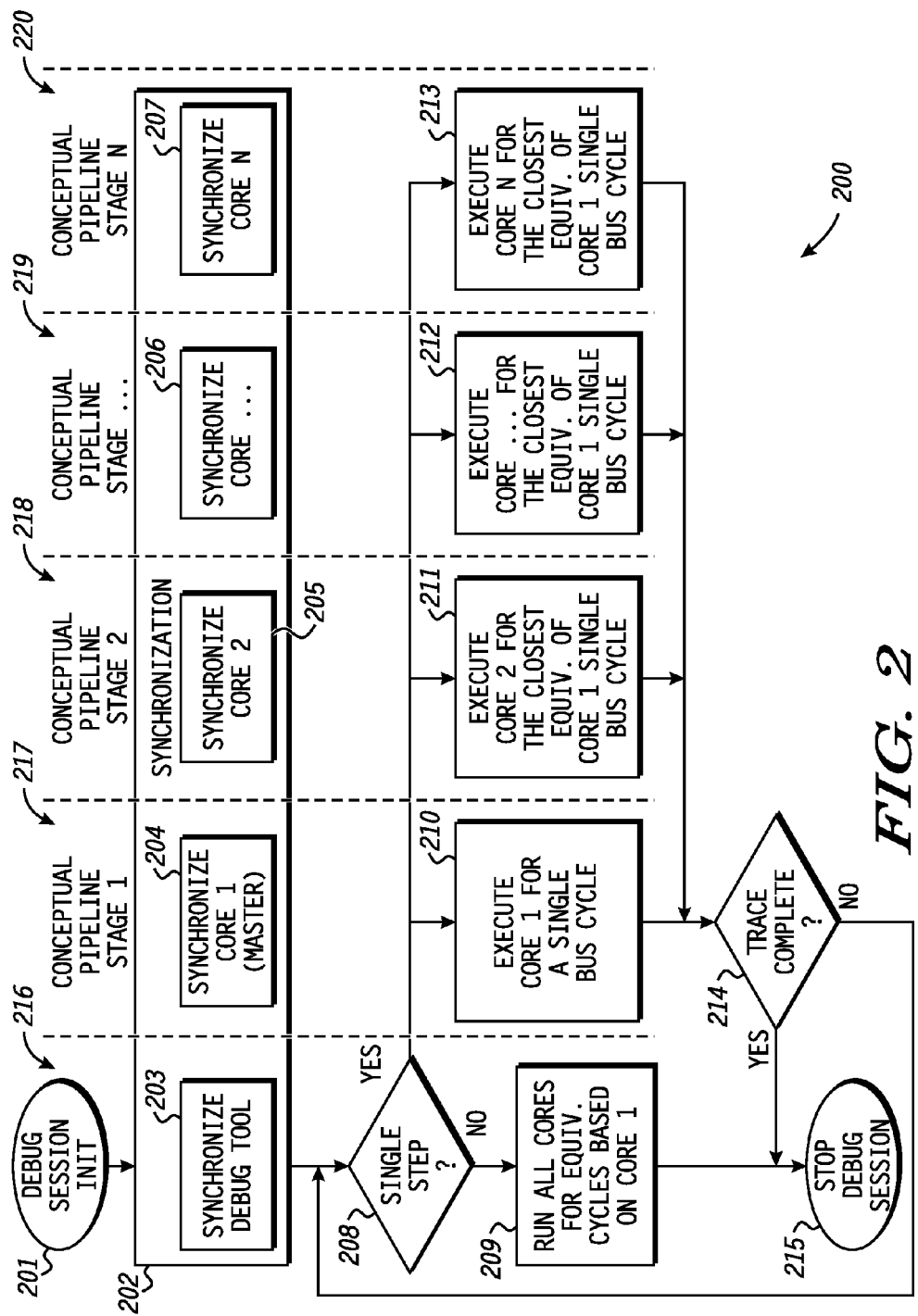
FIG. 2 is a flow diagram illustrating a method for debugging in accordance with at least one embodiment.

FIG. 2 is a flow diagram illustrating a method 200 for debugging in accordance with at least one embodiment. The method 200 is performed with respect to a debugger (shown by column 216), a conceptual pipeline stage 1 (shown by column 217), a conceptual pipeline stage 2 (shown by column 218), an intermediate conceptual pipeline stage (shown by column 219), and a final conceptual pipeline stage N (shown by column 220). The method begins in block 201 by initiating a debug session at the debugger. From block 201, the method proceeds to block 202, where synchronization is performed. Block 202 spans columns 216, 217, 218, 219, and 220 to indicate the synchronization of block 202 occurs at the debugger and at various pipeline stages. Thus, block 202 comprises performing synchronization of a debug tool as represented at block 203 within debugger column 216, performing synchronization of a (master) processor core 1 as represented at block 204 within conceptual pipeline stage 1 column 217, performing synchronization of a processor core 2 as represented at block 205 within conceptual pipeline stage 2 column 218, performing synchronization of an intermediate processor core as represented at block 206 within intermediate conceptual pipeline stage column 219, and performing synchronization of a final processor core N as represented at block 207 within final conceptual pipeline stage N column 220. As an example, synchronizer 146 of FIG. 1 may perform the synchronization of block 202. As another example, synchronizer 146 of FIG. 1 may perform synchronization of the debug tool at block 203, with synchronizer 109 performing synchronization of the (master) processor core 1 at block 204, with synchronizer 110 performing the synchronization of processor core 2, with synchronizer 111 performing they synchronization of processor core 3, and with synchronizer 112 performing the synchronization of processor core 4.

From block 202, the method continues to decision block 208. In decision block 208, a decision is made as to whether or not to single step through program code of processor core 1, processor core 2, the intermediate processor core, and final processor core N as part of the debug process. If the decision is made not to single step through the program code, the method continues to block 209. In block 209, the program code of all processor cores is run for an equivalent number of cycles based on a designated number of cycles of (master) processor core 1. As the timing of the processor cores may differ, processor cores other than processor core 1 may be run for a number of their own cycles that differs from the designated number of cycles of processor core 1. For example, the processor cores other than processor core 1 may be run a number of their own cycles that span an amount of time substantially equal to an amount of time spanned by the designated number of cycles of processor core 1. From block 209, the method continues to block 215, where the debug session stops.

If, in decision block 208, a decision is made to single step through the program code, the method continues to a plurality of blocks corresponding to pipeline stages 217-220. Each pipeline stage can represent operations performed using a different processor core, for example, a different processor core of a heterogeneous multicore processor. In particular, the method continues to block 210 within conceptual pipeline stage 1 column 217, to block 211 within conceptual pipeline stage 2 column 218, to block 212 within intermediate conceptual pipeline stage column 219, to block 213 within final conceptual pipeline stage column 220. Blocks 210, 211, 212, and 213 may be executed in parallel by their corresponding processor cores, e.g., by processor core 1, processor core 2, the intermediate processor core, and final processor core N, respectively. Thus, at block 210, processor core 1 executes its program code for a single system interconnect cycle with respect to the processor core timing domain of processor core 1; at block 211, processor core 2 executes its program code for the closest equivalent number of processor core 2 execution cycles that correspond in time to the single system interconnect cycle within which processor core 1 executes its program code; block 212, the intermediate processor core executes its program code for the closest equivalent number of intermediate processor core execution cycles that correspond in time to the single system interconnect cycle within which processor core 1 executes its program code; and at block 213, final processor core N executes its program code for the closest equivalent number of final processor core N execution cycles that correspond in time to the single system interconnect cycle within which processor core 1 executes its program code. As an example, processor core 101 of FIG. 1 may perform the execution at block 210, processor core 102 of FIG. 1 may perform the execution at block 211, processor core 103 of FIG. 1 may perform the execution at block 212, and processor core 104 of FIG. 1 may perform the execution at block 213. As an example, such execution may be performed, for example, using processor core interdependency mechanisms, such as locks, mutexes, or semaphores, to coordinate execution of instructions on processor cores such as the processor core 2, the intermediate processor core, and the final processor core N with execution of instructions on a master processor core, for example, the processor core 1. As another example, such execution may be performed by multiple single step commands sent from the debugger, where the numbers of multiple single step commands for the processor core 2, the intermediate processor core, and the final processor core N result in blocks 211, 212, and 213 spanning substantially the same amount of time, as denominated according to a common timing domain, as block 210. As yet another example, such execution may be performed by the debugger signaling all of the processor core 1, the processor core 2, the intermediate processor core, and the final processor core N to stop execution, for example, at the end of their current processor core cycles. As a further example, such execution may be performed by the debugger signaling the processor core 2, the intermediate processor core, and the final processor core N to stop execution in response to the processor core 1 stopping execution.

From blocks 210, 211, 212, and 213, the method continues to decision block 214. In decision block 214, a decision is made by the debugger (as with the blocks under debugger column 216) as to whether or not the trace is complete. If so, the method continues to block 215, where the debug session stops. If not, the method returns to decision block 208.

Figure 3:
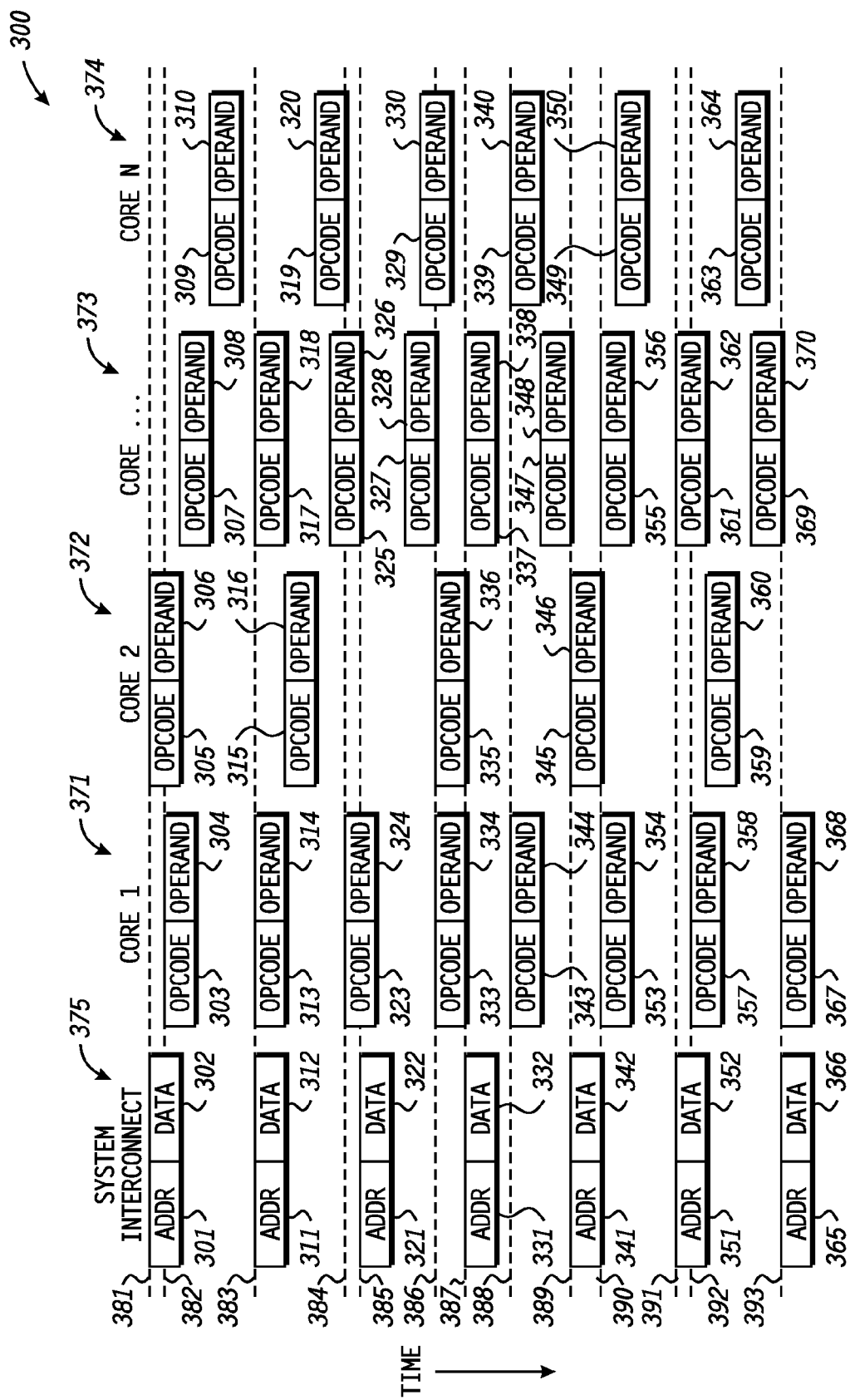
FIG. 3 is an instruction flow timing diagram illustrating temporal relationships between a system interconnect and multiple processor cores in accordance with at least one embodiment.

FIG. 3 is an instruction flow timing diagram 300 illustrating temporal relationships between a system interconnect and multiple processor cores in accordance with at least one embodiment. Time is illustrated as progressing downward along a vertical axis of FIG. 3. Horizontal lines at times 381, 382, 383, 384, 385, 386, 387, 388, 389, 390, 391, 392, and 393 depict instants in time along the vertical axis. Such times may be denominated in increments of a particular clock, such as the clock of a common timing domain, which may, for example, by the clock of a processor core designated as the master processor core or another clock to which signals from all of the processor cores may be synchronized for use by the debugging system (for example, a clock applicable to a common system interconnect structure, such as system interconnect structure 141 of FIG. 1). System interconnect activity over time is shown under system interconnect column 375. Instruction flow of processor core 1, processor core 2, the intermediate processor, and final processor core N over time are shown under processor core columns 371, 372, 373, and 374, respectively.

As can be seen in FIG. 3, the processor cores do not necessarily begin or complete execution of instructions at the same time, and the times a processor core begins or ends execution of an instruction may not be temporally aligned with a system interconnect timing domain or a processor core timing domain of another processor core. For example, under the system interconnect timing domain, at time 385, processor core 1 has begun but not yet finished execution of an instruction comprising opcode 323 and operand 324. As another example, under the processor core timing domain of processor core 1, at time 384, the intermediate processor core has begun but not yet finished execution of an instruction comprising opcode 325 and operand 326.

At time 381, address 301 and data 302 are present on the system interconnect (for example, system interconnect structure 141 of FIG. 1) and processor core 2 executes opcode 305 and operand 306. At time 382, address 301 and data 302 are still present on the system interconnect, processor core 2 is still executing opcode 305 and operand 306, and processor core 1 executes opcode 303 and operand 304. Between time 382 and time 383, the intermediate processor core executes opcode 307 and operand 308 and final processor core N executes opcode 309 and operand 310. The instructions (e.g., opcodes with their corresponding operands) are illustrated as being executed by different processor cores at different times from one another as the processor cores may be asynchronous or, since the processor cores may be heterogeneous, the processor cores may process the instructions differently from one another.

At time 383, address 311 and data 312 are present on the system interconnect, processor core 1 is executing opcode 313 and operand 314, and the intermediate processor core is executing opcode 317 and operand 318. Between time 383 and time 384, processor core 2 executes opcode 315 and operand 316, the intermediate processor core executes opcode 325 and operand 326, and the final processor core N executes opcode 319 and operand 320. At time 384, processor core 1 executes opcode 323 and operand 324 and the intermediate processor core is still executing opcode 325 and operand 326. At time 385, address 321 and data 322 are on the system interconnect and processor core 1 is still executing opcode 323 and operand 324, as the intermediate processor core finishes executing opcode 325 and operand 326. At time 386, processor core 1 executes opcode 333 and operand 334, processor core 2 executes opcode 335 and operand 336, final processor core N is still executing opcode 329 and operand 330, as the intermediate processor core finishes executing opcode 327 and 328. At time 387, address 331 and data 332 are on the system interconnect and the intermediate processor core executes opcode 337 and operand 338, as processor core 1 finishes executing opcode 333 and operand 334 and processor core 2 finishes executing opcode 335 and operand 336.

At time 388, processor core 1 executes opcode 343 and operand 344 and final processor core N executes opcode 339 and operand 340. At time 389, address 341 and data 342 are on the system interconnect and processor core 2 executes opcode 345 and operand 346, as the intermediate processor core finishes executing opcode 347 and operand 348. At time 390, processor core 1 executes opcode 353 and operand 354 and the intermediate processor core executes opcode 355 and operand 356, as the presence of address 341 and data 342 on the system interconnect are ending and processor core 2 finishes executing opcode 345 and operand 346. Between time 390 and time 391, final processor core N executes opcode 349 and operand 350. At time 391, address 351 and data 352 are on the system interconnect and the intermediate processor core executes opcode 361 and operand 362. At time 392, address 351 and data 352 are still on the system interconnect, the intermediate processor core is still executing opcode 361 and operand 362, and processor core 1 executes opcode 357 and operand 358. Between times 392 and 393, processor core 2 executes opcode 359 and operand 360, the intermediate processor core executes opcode 369 and operand 370, and final processor core N executes opcode 363 and operand 364. At time 393, address 365 and data 366 are on the system interconnect and processor core 1 executes opcode 367 and operand 368, as the intermediate processor core finishes executing opcode 369 and operand 370.

Times 381, 383, 385, 387, 389, 391, and 393 depict operation synchronous with a system interconnect timing domain of a system interconnect, which conveys system interconnect traffic, as illustrated under system interconnect column 375. Times 382, 383, 384, 386, 388, 390, 392, and 393 depict operation synchronous with a processor core timing domain of (master) processor core 1, which executes instructions, as illustrated under processor core column 371. While times 383 and 393 appear to be synchronous with both the system interconnect timing domain and the processor core timing domain, such a depiction is coincidental as a result of the finite resolution of the drawing, although, in accordance with at least one embodiment, one or more of the processor cores may be synchronous or asynchronous with each other and synchronous or asynchronous with a system interconnect. Also, more than one system interconnect may be present (e.g., a main system interconnect and a peripheral system interconnect), and such system interconnects may be synchronous or asynchronous with each other.

In accordance with at least one embodiment, for a given common timing interval under a given timing domain, a debugger processes only those instructions that have been completed within that given common timing interval. For example, a processor core may be executing, but may not yet have completed, an instruction as the common timing interval ends. Since that instruction wasn't completed within the common timing interval, that instruction would be included in the next common timing interval, not the current timing interval. In accordance with at least one embodiment, for a given common timing interval under a given timing domain, a debugger processes only those instructions completed within one processor core timing cycle of a completed system interconnect cycle that ends the common timing interval. For example, a processor core may be executing, but may not yet have completed, an instruction as the common timing interval ends. However, if the processor core completes that instruction within one processor core timing cycle of a completed system interconnect cycle that ends the common timing interval, that instruction may be included in that common timing interval, not the next common timing interval. In such an example, the end of the common timing interval is marked by the completion of a system interconnect cycle, and the tolerance for including the instruction being included in the common timing interval is one processor core timing cycle. As an example, such a one processor core timing cycle may be a processor core timing cycle of the processor core executing the instruction. As another example, such a one processor core timing cycle may be a processor core timing cycle of a processor core designated as a master processor core.

Figure 4:
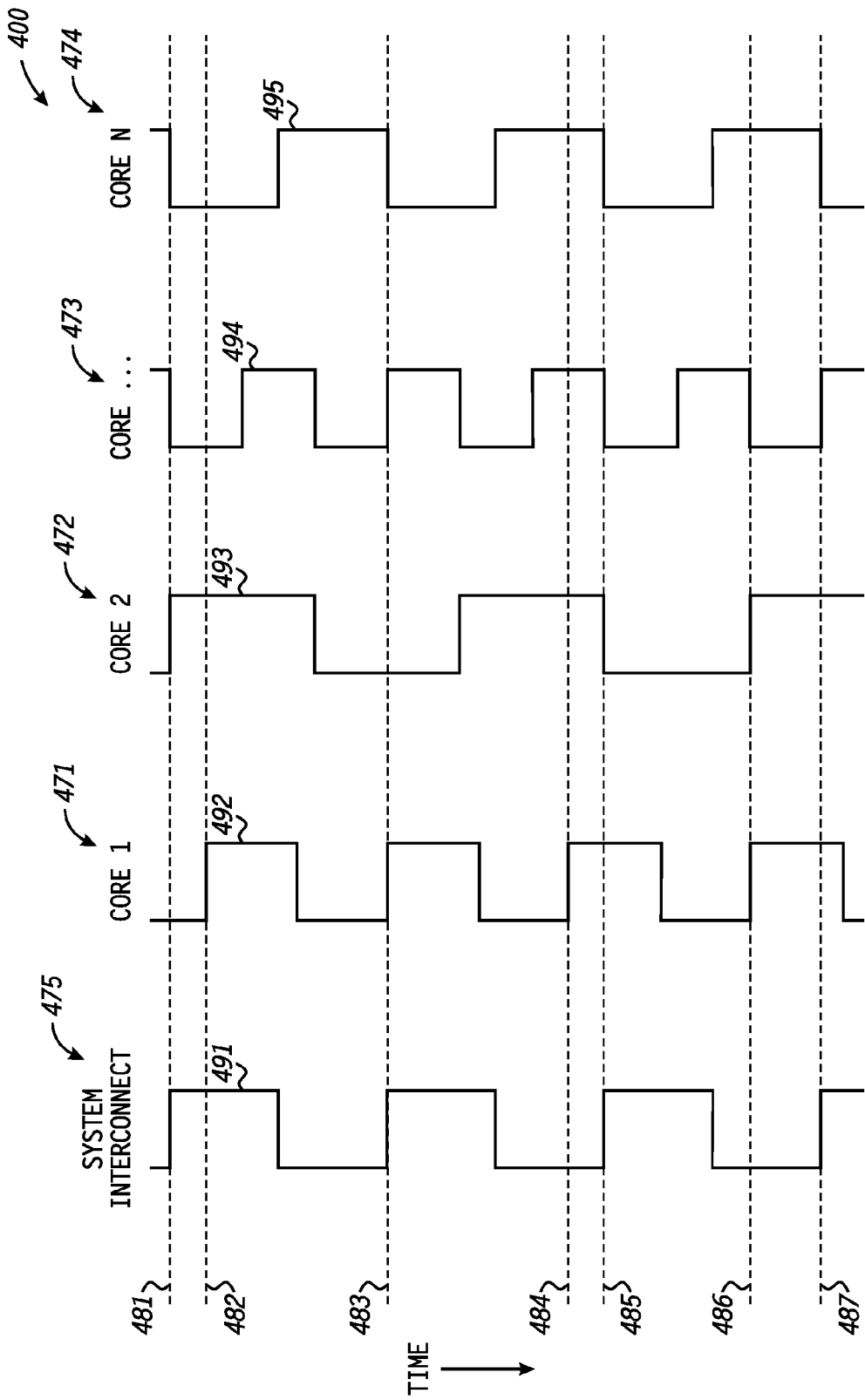
FIG. 4 is a timing diagram illustrating temporal relationships between a system interconnect and multiple processor cores in accordance with at least one embodiment.

FIG. 4 is a timing diagram 400 illustrating temporal relationships between a system interconnect and multiple processor cores in accordance with at least one embodiment. Time is illustrated as progressing downward along a vertical axis of FIG. 4. Horizontal lines at times 481, 482, 483, 484, 485, 486, and 487 depict instants in time along the vertical axis Such times may be denominated in increments of a particular clock, such as the clock of a common timing domain, which may, for example, by the clock of a processor core designated as the master processor core or another clock to which signals from all of the processor cores may be synchronized for use by the debugging system (for example, a clock applicable to a common system interconnect structure, such as system interconnect structure 141 of FIG. 1). System interconnect cycles over time are shown as a vertically progressing waveform 491 under system interconnect column 475. Processor core cycles of processor core 1, processor core 2, the intermediate processor, and final processor core N over time are shown as vertically progressing waveforms 492, 493, 494, and 495, respectively, under processor core columns 471, 472, 473, and 474, respectively.

Times 481, 483, 485, and 487 are illustrated as being synchronous with a system interconnect timing domain of the system interconnect and as occurring at the rising edges of a system interconnect signal. Times 482, 483, 484, and 486 are illustrated as being synchronous with a processor core timing domain of processor core 1 and as occurring at the rising edges of a processor core signal. While time 483 appears to be synchronous with both the system interconnect timing domain and the processor core timing domain, such a depiction is coincidental as a result of the finite resolution of the drawing.

As can be seen in FIG. 4, the processor cores do not necessarily begin or end processor core cycles at the same time, and the times a processor core begins or ends a processor core cycle may not be temporally aligned with a system interconnect timing domain or a processor core timing domain of another processor core. For example, under the system interconnect timing domain, at time 485, processor core 1 has begun but not yet finished a processor core cycle. As another example, under the processor core timing domain of processor core 1, at time 484, the intermediate processor core has begun but not yet finished a processor core cycle. In accordance with at least one embodiment, for a given common timing interval under a given timing domain, a debugger processes only those instructions that have been completed within that given common timing interval. The processor cores may stop processing subsequent instructions while the debugger processes the instructions completed within the given common timing interval, or the processor cores may continue to process subsequent instructions while the debugger processes the instructions completed within the given common timing interval. Since the information about the instructions of the processor cores being provided to the debugger are referenced to a common timing domain in which the common timing interval is defined, the debugger can easily distinguish between instructions that have been completed within the given common timing interval and instructions completed at some other time (e.g., before or after the given common timing interval). Thus, even if processor cores are continuing to execute instructions as the debugger processes instructions completed within the common timing interval, the debugging system may store information about instructions being completed after the common timing interval, and the debugger may later process such information when processing instructions completed in the subsequent common timing interval. In accordance with at least one embodiment, for a given common timing interval under a given timing domain, a debugger processes only those instructions completed within one processor core timing cycle of a completed system interconnect cycle that ends the common timing interval.

Figure 5:
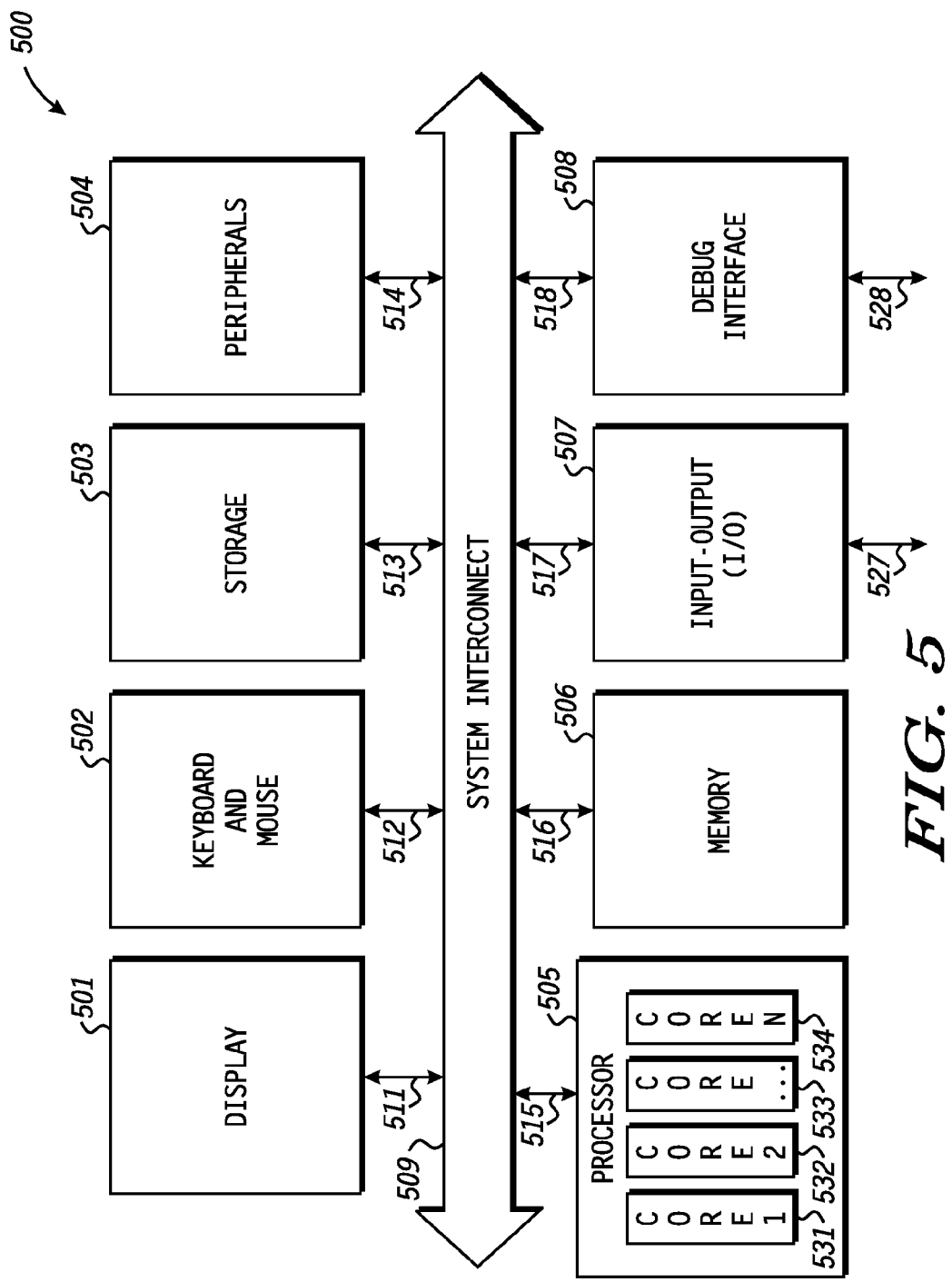
FIG. 5 is a block diagram illustrating a processing system which may be used in accordance with at least one embodiment.

FIG. 5 is a block diagram illustrating a processing system 500 which may be used in accordance with at least one embodiment. Processing system 500 comprises display 501, keyboard and mouse 502, storage 503, peripherals 504, processor 505, memory 506, input-output (I/O) 507, debug interface 508, and system interconnect 509. Processor 505 may be a multicore processor comprising, for example, cores 531, 532, 533, and 534. Display 501 is connected to system interconnect 509 via system interconnect connection 511. Keyboard and mouse 502 are connected to system interconnect 509 via system interconnect connection 512. Storage 503 is connected to system interconnect 509 via system interconnect connection 513. Peripherals 504 are connected to system interconnect 509 via system interconnect connection 514. Processor 505 is connected to system interconnect 509 via system interconnect connection 515. Memory 506 is connected to system interconnect 509 via system interconnect connection 516. Input-output (I/O) 507 is connected to system interconnect 509 via system interconnect connection 517. Debug interface 508 is connected to system interconnect 509 via system interconnect connection 518. Input-output (I/O) 507 may be connected to external devices via external connection 527. Debug interface 508 may be connected externally via external connection 528.

As one example, system 500 may be used to implement processor cores 101, 102, 103, and 104, system interconnect structure 141, and shared memory 105, 106, 107, and 108 of FIG. 1 with corresponding processor cores 531, 532, 533, and 534, corresponding system interconnect 509, and corresponding memory 506, respectively. As another example, system 500 may be used to implement debugger 148 and debug interface 147 of FIG. 1 with corresponding elements 501, 502, 503, 504, 505, 506, and 507 and corresponding debug interface 508, respectively.

Figure 6:
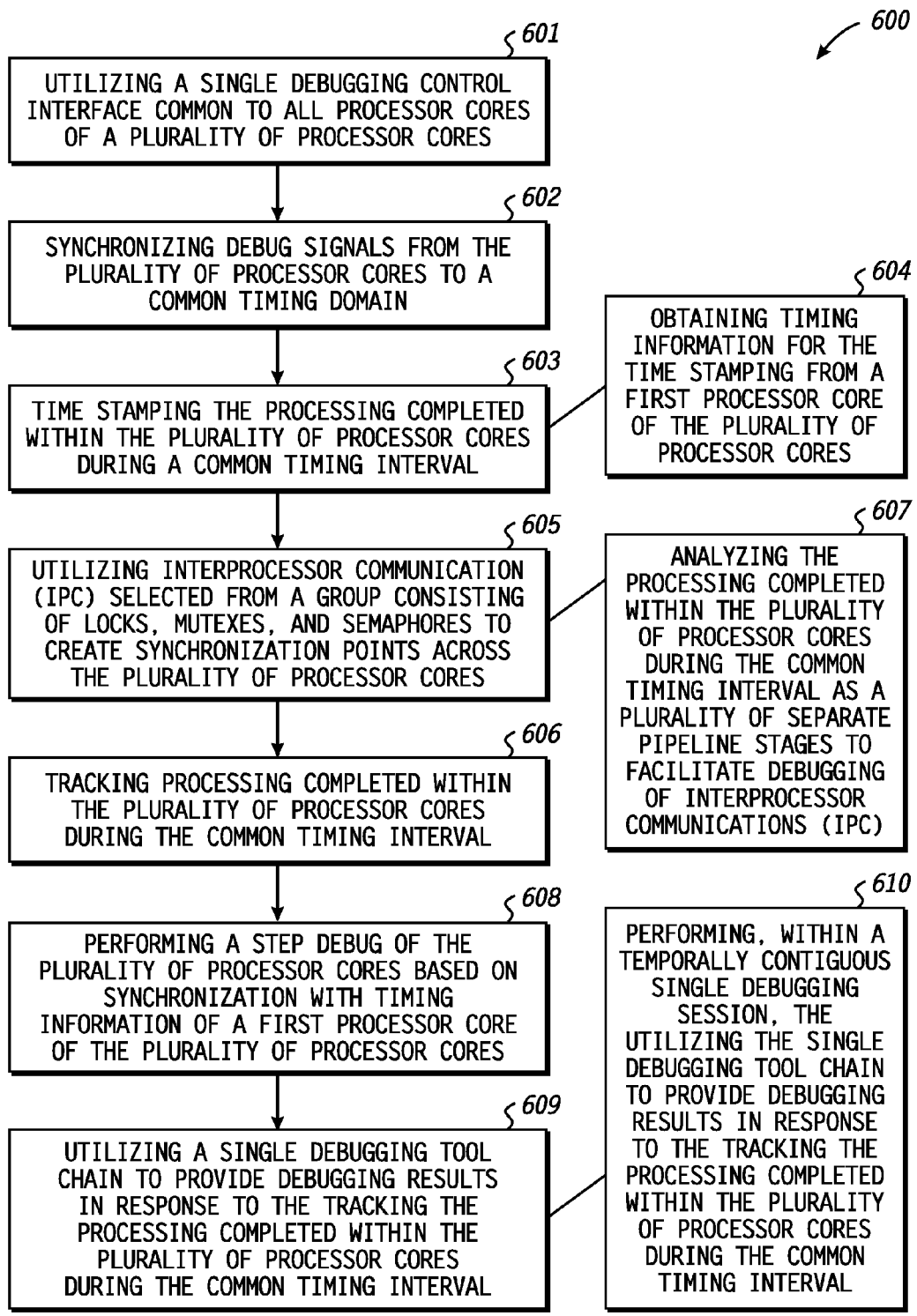
FIG. 6 is a flow diagram illustrating a method for providing debugging capability for multiple processor cores in accordance with at least one embodiment.

FIG. 6 is a flow diagram illustrating a method 600 for providing debugging capability for multiple processor cores in accordance with at least one embodiment. In block 601, a single debugging control interface common to all processor cores of the plurality of processor cores is utilized. Block 601 may, for example, be provided before other method blocks occur and may, for example, remain in place for subsequent method blocks. In block 602, debug signals from a plurality of processor cores are synchronized to a common timing domain. In block 603, time stamping the processing completed within the plurality of processor cores during the common timing interval occurs. Timing information for the time stamping may be obtained from a first processor core of the plurality of processor cores, as shown in block 604. Time stamping, with reference to a common timing domain, of the processing completed within the plurality of processor cores during the common timing interval allows meaningful comparison between the timing of processing completed within different processor cores of the plurality of processor cores, which may be, as an example, asynchronous to one another or, as another example, heterogeneous with respect to one another. As the debug buffer structure (e.g., debug buffer structure 145 of FIG. 1) includes synchronizer 151 and can synchronize the signals it receives via connections 137, 138, 139, 140, and 144, the debug buffer structure can use the timing information available via one of those connections as a timing reference to obtain time stamps for signals received via those connections even if those signals are asynchronous with that timing information. Thus, the debug buffer structure can time stamp and store information descriptive of processing completed within the plurality of processor cores during the common timing interval.

In block 605, interprocessor communication (IPC) selected from a group of locks, mutual exclusions (mutexes), and semaphores is utilized to create synchronizations points across the plurality of processor cores. For example, locks, mutexes, or semaphores may be used to coordinate processing among the plurality of processor cores and to establish or enforce relationships (e.g., temporal relationships, logical dependencies, and the like) between the processing being performed by the plurality of processor cores. As an example, locks, mutexes, or semaphores may be used to relate the processing of several of the plurality of processor cores to the processing of a processor core designated to be a master processor core, allowing a common timing interval to be established relative to a common timing domain of the master processor core. Thus, a single common debugging tool chain can monitor processing among the plurality of processor cores with respect to a common timing interval of a common timing domain.

In block 606, tracking of processing completed within the plurality of processor cores during a common timing interval is performed. Such tracking may include analyzing the processing completed within the plurality of processor cores during the common timing interval as a plurality of separate pipeline stages to facilitate debugging of interprocessor communications (IPC), as shown in block 607. By determining the relationships of the separate pipeline stages to one another, such as temporal relationships and logical dependencies, the processing completed within the plurality of processor cores during the common timing interval can be organized within the context of the overall processing being performed by all of the processor cores. Such tracking allows temporal relationships and logical dependencies between operations of the plurality of processor cores to be determined, which allows presentation of a unified representation of the processing occurring among the plurality of processor cores.

In block 608, a step debug of the plurality of processor cores is performed based on synchronization with timing information of a first processor core of the plurality of processor cores. In block 609, a single debugging tool chain is utilized to provide debugging results in response to the tracking the processing completed within the plurality of processor cores during the common timing interval. The utilizing the single debugging tool chain to provide debugging results in response to the tracking the processing completed within the plurality of processor cores during the common timing interval may be performed within a temporally contiguous single debugging session, as shown in block 610. The temporally contiguous single debugging session allows the processing among the plurality of processor cores to be presented with respect to a common timing domain. By presenting the relationships of the processing among the plurality of processor cores with respect to a common timing domain, the events described as part of the single debugging session can be related in time with the granularity of a clock of the common timing domain, thereby providing the temporally contiguous single debugging session. In accordance with at least one embodiment, the plurality of processor cores are heterogeneous processor cores. In accordance with at least one embodiment, the plurality of processor cores are asynchronous processor cores. In accordance with at least one embodiment, the plurality of processor cores are asynchronous heterogeneous processor cores.

In accordance with at least one embodiment, a method comprises synchronizing debug signals from a plurality of processor cores to a common timing domain and transmitting debug messages based on the debug signals via a single debug interface common to all processor cores of the plurality of processor cores to enable tracking of processing completed within the plurality of processor cores during a common timing interval. In accordance with at least one embodiment, the debug messages comprise interprocessor communications (IPC) debug messages based on IPC between at least two processor cores of the plurality of processor cores. In accordance with at least one embodiment, the method further comprises time stamping the processing completed within the plurality of processor cores during the common timing interval. In accordance with at least one embodiment, the time stamping further comprises obtaining timing information for the time stamping from a first processor core of the plurality of processor cores. In accordance with at least one embodiment, the time stamping further comprises obtaining timing information for the time stamping from a system interconnect coupled to the plurality of processor cores. In accordance with at least one embodiment, the method further comprises creating synchronization points across the plurality of processor cores based on interprocessor communication (IPC) selected from a group consisting of locks, mutexes, and semaphores to enable the tracking of processing completed within the plurality of processor cores during the common timing interval. In accordance with at least one embodiment, the method further comprises utilizing a single debugging tool chain to provide debugging results in response to tracking the processing completed within the plurality of processor cores during the common timing interval. In accordance with at least one embodiment, the utilizing a single debugging tool chain to provide debugging results in response to the tracking the processing completed within the plurality of processor cores during the common timing interval is performed within a temporally contiguous single debugging session.

In accordance with at least one embodiment, the plurality of processor cores include processing cores of at least two different types. In accordance with at least one embodiment, at least two different cores of the plurality of processor cores are not synchronous. In accordance with at least one embodiment, the method further comprises performing a step debug of the plurality of processor cores based on synchronization with timing information of a first processor core of the plurality of processor cores. In accordance with at least one embodiment, the method further comprises performing a step debug of the plurality of processor cores based on synchronization with timing information of a system interconnect coupled to the plurality of processor cores.

In accordance with at least one embodiment, apparatus comprise a plurality of processor cores, a debug synchronizer coupled to the plurality of processor cores for synchronizing debugging signals from the plurality of processor cores to a common timing domain, and a debug interface coupled to the debug synchronizer, wherein the debug interface transmits debug information referencing an order of processing completed by the plurality of processor cores with respect to the common timing domain. In accordance with at least one embodiment, the debug interface transmits debug information for interprocessor communications (IPC) to correlate the processing completed by the plurality of processor cores within an interval of the common timing domain. In accordance with at least one embodiment, time stamping is applied to a record of the processing completed by the plurality of processor cores, wherein the time stamping is referenced to the common timing domain. In accordance with at least one embodiment, time stamping is applied to a record of the processing completed by the plurality of processor cores, wherein the time stamping is referenced to a timing of a first core. In accordance with at least one embodiment, interprocessor communication (IPC) selected from a group consisting of locks, mutexes, and semaphores is used to create debugging synchronization points. In accordance with at least one embodiment, the apparatus further comprises a single common debugging control interface common to all of the plurality of processor cores. In accordance with at least one embodiment, at least two processors of the plurality of processor cores are of different types. In accordance with at least one embodiment, at least two processors of the plurality of processor cores are asynchronous with each other. In accordance with at least one embodiment, debugging for all of the plurality of processor cores is performed within a temporally contiguous single common debugging session.

In accordance with at least one embodiment, a method comprises synchronizing system interconnect signals of a plurality of processor cores to a system interconnect timing domain of a system interconnect coupled to the plurality of processor cores and synchronizing debug signals of a plurality of processor cores to a common timing domain of a common debug interface. In accordance with at least one embodiment, the method further comprises transmitting via the common debug interface debug messages pertaining to processing completed by the plurality of processor cores during a common timing interval. In accordance with at least one embodiment, the processing completed by the plurality of processor cores during the common timing interval comprises processing completed by the plurality of processor cores within a clock cycle of the common timing interval. In accordance with at least one embodiment, the clock cycle is selected from a group consisting of a common timing domain clock cycle of the common timing domain, a processor core clock cycle of one processor core of the plurality of processor cores, and a system interconnect clock cycle of the system interconnect. In accordance with at least one embodiment, the debug messages comprise interprocessor communications (IPC) debug messages based on IPC between at least two processor cores of the plurality of processor cores.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Some of the above embodiments, as applicable, may be implemented using a variety of different information processing systems.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   synchronizing debug signals from a plurality of processor cores to a common timing domain;
   transmitting debug messages based on the debug signals via a single debug interface common to all processor cores of the plurality of processor cores to enable tracking of processing completed within the plurality of processor cores during a common timing interval.

2. The method of claim 1 wherein the debug messages comprise interprocessor communications (IPC) debug messages based on IPC between at least two processor cores of the plurality of processor cores.

3. The method of claim 1 further comprising:
   time stamping the processing completed within the plurality of processor cores during the common timing interval.

4. The method of claim 3 wherein the time stamping further comprises:
   obtaining timing information for the time stamping from a first processor core of the plurality of processor cores.

5. The method of claim 3 wherein the time stamping further comprises:
   obtaining timing information for the time stamping from a system interconnect coupled to the plurality of processor cores.

6. The method of claim 1 further comprising:
   creating synchronization points across the plurality of processor cores based on interprocessor communication (IPC) selected from a group consisting of locks, mutexes, and semaphores to enable the tracking of processing completed within the plurality of processor cores during the common timing interval.

7. The method of claim 1 wherein the plurality of processor cores include processing cores of at least two different types.

8. The method of claim 1 wherein at least two different cores of the plurality of processor cores are not synchronous.

9. The method of claim 1 further comprising:
   performing a step debug of the plurality of processor cores based on synchronization with timing information of a first processor core of the plurality of processor cores.

10. The method of claim 1 further comprising:
    performing a step debug of the plurality of processor cores based on synchronization with timing information of a system interconnect coupled to the plurality of processor cores.

11. Apparatus comprising:
    a plurality of processor cores;
    a debug synchronizer coupled to the plurality of processor cores for synchronizing debugging signals from the plurality of processor cores to a common timing domain; and
    a debug interface coupled to the debug synchronizer, wherein the debug interface transmits debug information referencing an order of processing completed by the plurality of processor cores with respect to the common timing domain.

12. The apparatus of claim 11 wherein the debug interface transmits debug information for interprocessor communications (IPC) to correlate the processing completed by the plurality of processor cores within an interval of the common timing domain.

13. The apparatus of claim 11 wherein time stamping is applied to a record of the processing completed by the plurality of processor cores, wherein the time stamping is referenced to the common timing domain.

14. The apparatus of claim 11 wherein time stamping is applied to a record of the processing completed by the plurality of processor cores, wherein the time stamping is referenced to a timing of a first core.

15. The apparatus of claim 11 further comprising:

a single common debugging control interface common to all of the plurality of processor cores.

16. A method comprising:

synchronizing system interconnect signals of a plurality of processor cores to a system interconnect timing domain of a system interconnect coupled to the plurality of processor cores;

synchronizing debug signals of a plurality of processor cores to a common timing domain of a common debug interface.

17. The method of claim 16 further comprising:

transmitting via the common debug interface debug messages pertaining to processing completed by the plurality of processor cores during a common timing interval.

18. The method of claim 17 wherein the processing completed by the plurality of processor cores during the common timing interval comprises:

processing completed by the plurality of processor cores within a clock cycle of the common timing interval.

19. The method of claim 18 wherein the clock cycle is selected from a group consisting of a common timing domain clock cycle of the common timing domain, a processor core clock cycle of one processor core of the plurality of processor cores, and a system interconnect clock cycle of the system interconnect.

20. The method of claim 17 wherein the debug messages comprise interprocessor communications (IPC) debug messages based on IPC between at least two processor cores of the plurality of processor cores.

* * * * *